United States Patent [19]

Huang

[11] 4,072,251
[45] Feb. 7, 1978

[54] AUTOMATIC SEED SINGULATING AND DISPENSING APPARATUS

[76] Inventor: Barney K. Huang, 5108 Kaplan Drive, Raleigh, N.C. 27606

[21] Appl. No.: 708,129

[22] Filed: July 23, 1976

Related U.S. Application Data

[63] Continuation of Ser. No. 479,618, June 17, 1974, abandoned.

[51] Int. Cl.² .............................................. G01F 11/10
[52] U.S. Cl. .................................... 222/333; 222/361; 221/264
[58] Field of Search ................................ 221/263–264, 221/68; 222/361, 275–276, 333, 361; 141/244, 238; 111/79, 71, 34

[56] References Cited

U.S. PATENT DOCUMENTS

| | | | |
|---|---|---|---|
| 765,968 | 7/1904 | Gibbs | 222/361 X |
| 1,343,924 | 6/1920 | McCorkle | 222/361 X |
| 1,548,097 | 8/1925 | Query | 221/264 X |
| 1,597,246 | 8/1926 | Query | 221/264 X |
| 2,161,190 | 6/1939 | Paull | 222/361 X |
| 2,879,918 | 3/1959 | Zubal et al. | 221/264 X |
| 3,073,486 | 1/1963 | Ratcliffe | 222/276 X |
| 3,307,749 | 3/1967 | Ursetta | 222/276 |

Primary Examiner—Robert B. Reeves
Assistant Examiner—Charles A. Marmor
Attorney, Agent, or Firm—Larry L. Coats

[57] ABSTRACT

The present invention relates to an automatic seed singulating and dispensing apparatus adapted to singulate and dispense seeds from a hopper into a growing medium such as a series of soil pots or cubes. The seed singulating and dispensing apparatus comprises a frame structure having a hopper disposed about the upper portion thereof and including a series of three plates associated therewith. Disposed within the hopper is a seed buffer structure that lies just above an upper seed singulating plate. During operation the seed singulating plate moves relative to the seed buffer structure and the seeds within the hopper are moderately agitated and tend to assure that vacant seed openings within said seed singulating plate are filled.

3 Claims, 7 Drawing Figures

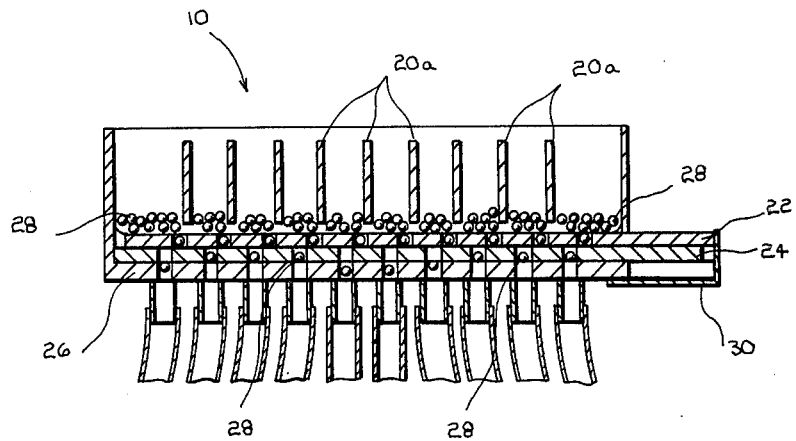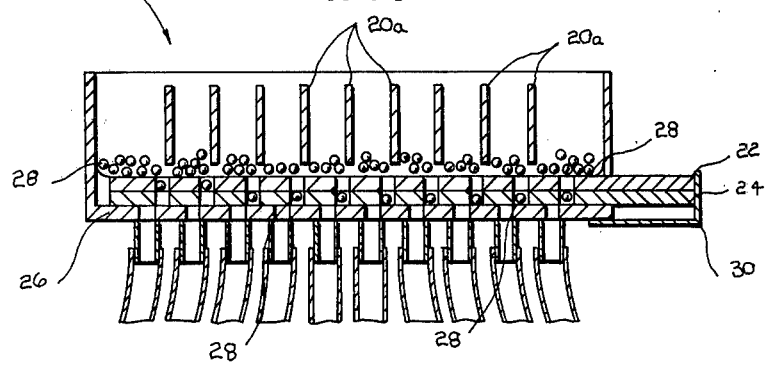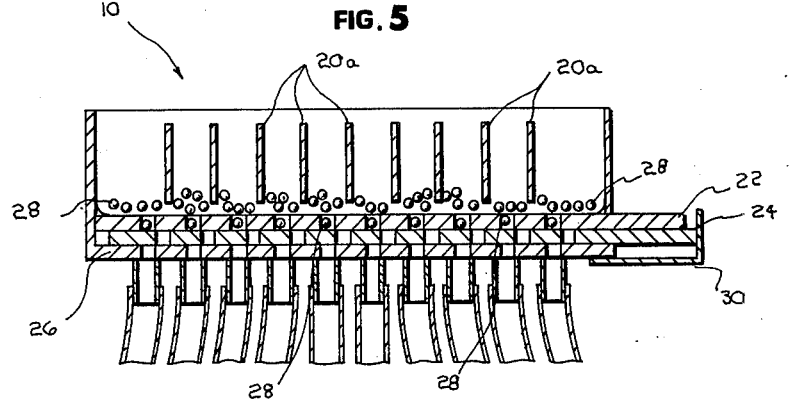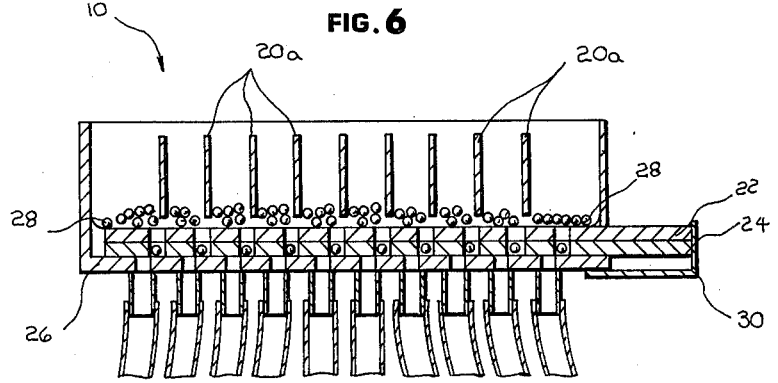

AUTOMATIC SEED SINGULATING AND DISPENSING APPARATUS

This is a continuation application of U.S. application Ser. No. 479,618, filed June 17, 1974 now abandoned.

The present invention relates to seed handling mechanisms, and more particularly to a seed singulation and dispensing apparatus of the type adapted to selectively singulate seeds from a bulk supply and to dispense the singulated seeds from the apparatus.

BACKGROUND OF THE INVENTION

In recent years, nurseries and other plant and horticultural commercial operations have recognized the need for a high capacity precision seeder in their seeding operations. In such commercial seeding operations, it is desirable for the seeder to work in conjunction with a conveyor system carrying groups of soil filled pots or soil cubes or the like. Typically, the conveyor system is intermittingly actuated such that groups of the soil pots or soil cubes come into operative relationship with the seeder periodically. While such groups of soil pots or cubes are stationarily disposed, the seeder, which is normally mounted thereabove, is actuated resulting in a seed being dispensed into each soil pot or cube.

While the need for such commercial seeders has been apparent, nevertheless, a fully automatic high capacity seeder with a relatively high singulation rate has not been developed heretobefore. One principal problem area has been in seed singulation, particularly automatic singulation where the singulation rate exceeds 95 percent. Typically, seeders of the prior art do not even attempt to automatically singulate. Instead, a worker is required to manually brush the seeds about a top singulation seed plate until all or nearly all of the seed openings therein are filled. This manual brushing is required after each separate actuation of the seeder.

Even after the seeds are singulated, many seeders of the prior art have problems efficiently transferring the singulated seeds to the soil pots. In this regard, typical problems encountered are jamming and clogging of the singulated seeds within the transfer structure and singulated seeds intergrating with other singulated seeds during the transferring operation.

SUMMARY OF THE INVENTION

The present invention has been devised in view of the problems with seeders of the prior art, and presents a fully automatic precision seeder that is particularly adapted to automatically or semi-automatically singulate seeds prior to dispensing them from the apparatus of the present invention. In particularly, the automatic precision seeder of the present invention comprises a hopper having an upper slidably mounted seed singulation plate disposed therein and generally forming the bottom of said hopper. The seed singulation plate includes a plurality of spaced apart seed receiving openings formed therein. Stationarily disposed above the seed singulation plate is a buffer structure that cooperates with said seed singulation plate to automatically singulate the seeds in the hopper prior to dispensing. In this regard, control means is provided for slidably moving the singulation plate relative to the buffer structure prior to the seeds therein being transferred therefrom for dispensing into soil pots or cubes. This movement of the seed singulation plate with respect to the seed buffer structure causes the seeds within the hopper to be moderately agitated and this in turn tends to fill any vacant seed receiving openings formed within said seed singulating plate.

Once this singulating operation is completed, a transfer plate disposed immediately below said seed singulating plate receives the respective seeds and through a control system is moved to a position where the seeds therein are transferred through a dispensing plate, and on through drop tubes to where the singulated seeds are received by soil pots or some other growing medium.

It is, therefore, an object of the present invention to provide a precision seeder that mechanically singulates the seeds prior to dispensing.

Another object of the present invention is to provide an automatic seeder wherein singulation and dispensing is automatic and sequentially controlled.

Still a further object of the present invention is to provide an automatic seeder capable of being integrated into a commercial seeding system.

A further object of the present invention is to provide an efficient high speed reliable seeder that is economical and is relatively simple in design and can easily be maintained.

Other objects and advantages of the present invention will become apparent from a study of the following description and the accompanying drawings which are merely illustrative of the present invention.

BRIEF DESCRIPTION OF THE DRAWINGS

FIGS. 2 through 6 are a series of sectional views of the automatic seeder of the present invention including the hopper, seed buffer structure and the seed plates, the views illustrating the basic sequence of operation of the various plates during one single actuation of the automatic seeder of the present invention.

DESCRIPTION OF THE PREFERRED EMBODIMENT

Figure 1:
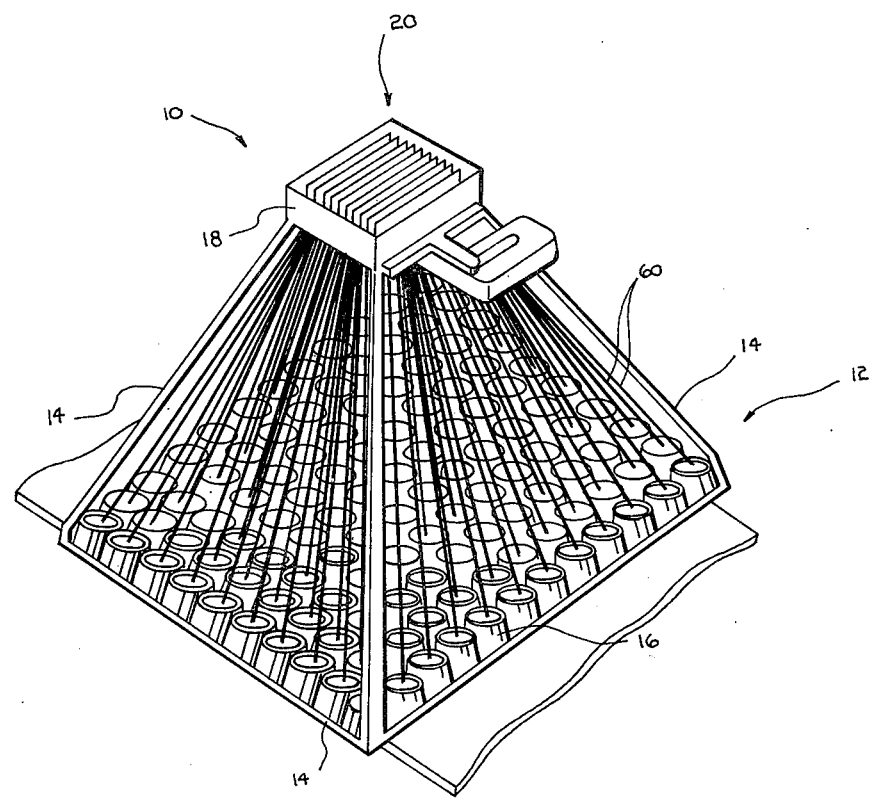
FIG. 1 is a diagrammatic like illustration of the basic structure of the automatic seeder of the present invention.

With further reference to the drawings, the automatic seeder of the present invention is shown therein and indicated generally by the numeral 10. Viewing the seeder 10 in greater detail, it is seen that the same comprises a pyramidal shaped frame, indicated generally at 12 and including a series of vertical legs 14 with the legs being joined about the lower portions thereof by a rectangular open frame 16.

Mounted about the upper portion of the frame 12 is a seed hopper 18 adapted to contain a bulk volume of seeds therein. Hopper 18, as illustrated in the drawings, includes four sides and there is stationarily mounted within the hopper a seed buffer structure indicated generally at 20. The seed buffer structure 20 includes a plurality of spaced apart, vertically disposed plates 20a that extend generally the entire width of the hopper 18. Slidably mounted within the lower portion of the hopper 18 is a seed singulating plate 22, the seed singulating plate 22 generally forming the bottom of the hopper 18 and spaced just below the plates 20a of the seed buffer structure 20. Immediately below the seed singulating plate 22 is a transfer plate 24 that is also slidably mounted within the hopper 18. Below the seed transfer plate 24 is a stationary dispensing plate 26, the dispensing plate 26 being integrally constructed with the walls of the hopper 18.

In each of the plates 22, 24 and 26, there is formed a plurality of seed receiving openings 28, the seed receiving openings being aligned in rows and columns and being particularly spaced apart such that when any two plates are disposed in squarely overlying relationship the respective seed receiving openings thereof are in vertical alignment. It should be pointed out that the seed receiving openings 28 are particularly bored completely through each plate and the diameter or size thereof is particularly chosen with respect to the type and variety of seed contemplated to be dispensed. In this regard, it is desirable that the seed receiving openings 28 be slightly greater than the diameter of the seeds contemplated to be dispensed, but not great enough to allow more than one seed to pass therethrough simultaneously.

Extending from below the hopper is a plate stop 30 that is turned up on one side thereof and acts as a stop to limit the outward movement of the singulating and transfer plates 22 and 24. Both the singulating plate 22 and transfer plate 24 are spring biased to abut against the plate stop 30. For biasing these plates to this position, there is provided a U-shaped spring 36 for biasing the transfer plate 24, and for biasing the singulating plate, there is provided a pair of coil springs 34 connected to an extension member 32, extending from the singulating plate 22, and anchored at a point outwardly thereof.

Figure 7:
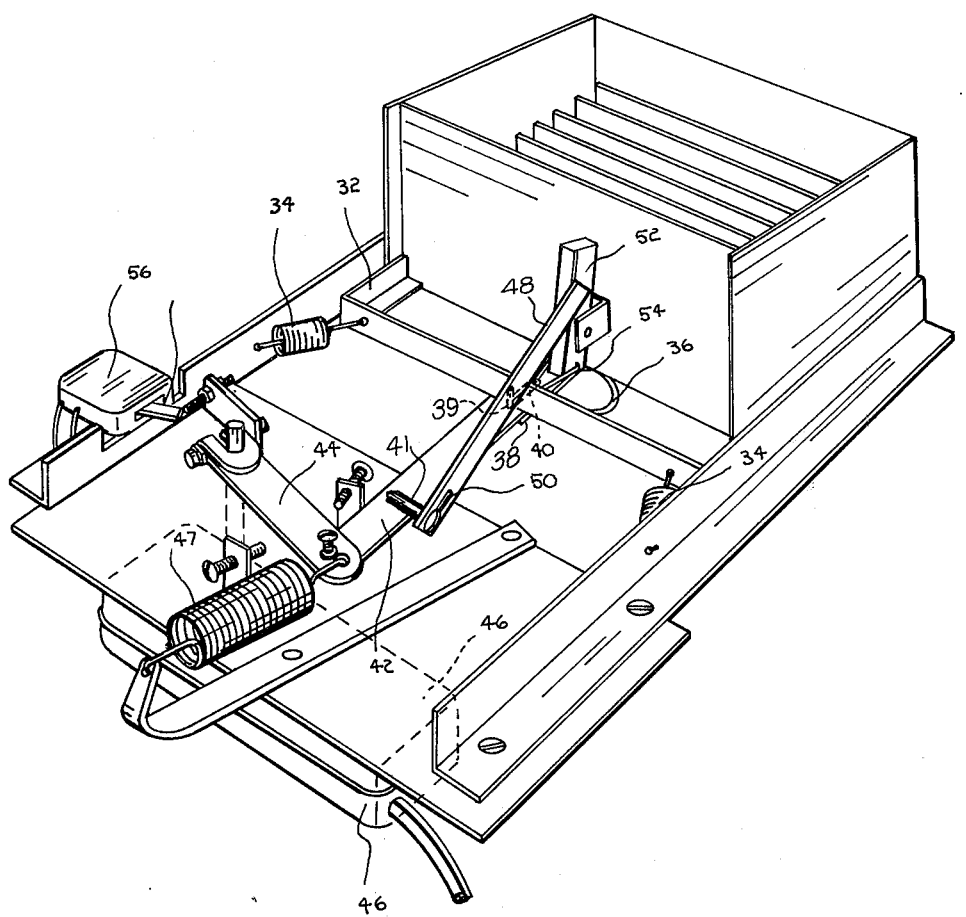
FIG. 7 is a perspective view of the seeder, as viewed from the top and to one side, particularly illustrating the control system and linkage for sequentially actuating and controlling the singulating and transfer plates of the seeder.

Extending from the transfer plate 24 is a narrow extension tongue 38 which includes a lost motion slot 40 that receives a connecting pin 39 from a connecting link 42. The connecting link 42 is in turn operatively connected to a radius arm 44 that is secured to the power shaft of an electric motor of the type having an internal gear box for providing for a back-and-forth sweeping or oscillating motion. Also, as viewed in FIG. 7, there is provided a return coil spring 47 that is provided to bias the connecting link 42 to a position outwardly of the transfer plate 24.

To drive the singulating plate 22, there is provided an auxiliary drive arm 48 that includes a lost motion slot 50 formed therein, the slot being adapted to receive a driving pin 41 secured to the connecting link 42. Auxiliary drive arm 48 extends towards the hopper 18 where an end thereof is pivotedly connected to the upper portion of a lever arm 52 which is in turn pivotably mounted to a side of the hopper 18. Extending between the lower end of the lever arm 52 and the singulating plate extension 32 is a connecting link 54. The auxiliary drive arm 48 and the slot 50 formed therein are particularly disposed such that the drive arm 48 is only driven on the aft stroke of the connecting link 42. It is seen that on the fore stroke of the connecting link 42 that the slot 50 formed within the auxiliary drive arm 48 allows the drive arm to remain stationary.

To actuate the electric motor 46, there is provided a toggle switch 56 which is operatively connected to the electric motor. The toggle switch 56 is preferably positioned such that at an appropriate time a stop carried by the radius arm 44 will engage the switch and move the same to an "off" position. This "off" position is achieved when the radius arm has swung from its initial position to where the connecting link has driven the transfer plate 24 to a position closely adjacent the back side of the hopper 18. This is referred to as the fore stroke. The aft stroke of the connecting link 42 is achieved by the tension associated with the return spring 47. Because the transfer plate 24 is spring biased to return to the initial position adjacent the plate stop 30, it follows that as a connecting link 42 moves towards the coil spring 47 that the transfer plate 24 is free to move back to its initial position.

As the connecting link 42 is pulled back by the return spring 47, the connecting pin within the slot 50 of the auxiliary drive arm 48 pulls the auxiliary arm rearwardly also. The rearward movement of the auxiliary arm 48 results in the singulating plate 22 being driven from its initial position adjacent the plate stop 30 to a position where the opposite edge thereof lies closely adjacent the opposite side of the hopper 18. Because the seed singulating 22 is biased by the spring 34, it follows that the singulating plate 22 returns to its initial position.

Therefore, it is appreciated that the control and linkage mechanism just described above its operative upon each actuation of the motor 46 to reciprocally drive both the transfer plate 24 and seed singulating plate 22 in sequence.

Figure 2:
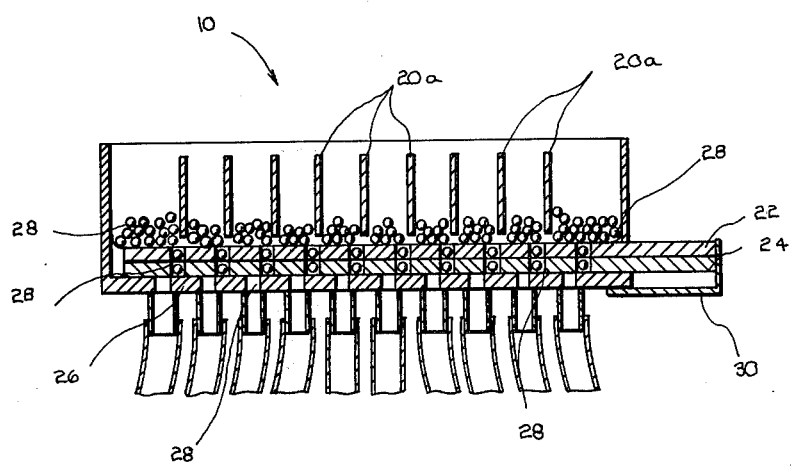

Briefly reviewing these sequential operations of the automatic seeder of the present invention as illustrated in FIGS. 2 through 6, it is seen that as in FIG. 2, the seed singulating plate 22 and transfer plate 24 are in the initial position and seeds are disposed in the seed receiving openings 28 thereof. The actuation of the motor 46 results in the seed transfer plate 24 being driven to the left, as viewed in FIGS. 2 through 6, to a second position where the seed receiving openings 28 thereof align with the seed receiving openings 28 of the dispensing plate 26. Once this position is achieved, the seeds within the receiving openings 28 of the transfer plate 24 fall through the seed receiving openings 28 of the dispensing plate, and downwardly on through the down spouts 58 and on through the drop tubes 60 where the seeds are received by soil pots or some other growing medium. It should be pointed out at this point that the lower ends of the drop tubes 60 can be maintained at any desired spacing by the use of a wire grid structure that stretches across the lower portion of the frame structure 12.

After the seeds have been dispensed, the biasing of the U-shaped spring 36 dictates that the transfer plate 24 return to its initial position (FIG. 3).

Simultaneously, the aft stroke of the connecting link 42 results in the seed singulating plate being shifted to the left to a second position as shown in FIG. 4. After reaching this position, the seed singulating plate 22 is biased back to its initial position by the action of the springs 34. Consequently then, it is seen that after the transfer plate 24 has returned to its initial position, the seed singulating plate cycles back and forth. This back-and-forth movement of the seed singulating plate 22 relative to the plates 28 of the buffer structure tends to moderately agitate the seeds within the hopper 18 and tends to assure that any vacant seed receiving openings therein are filled and consequently that the rate of singulation and dispensing is relatively high for each actuation of the automatic seeder 10.

What is claimed is:
1. A singulating and dispensing apparatus comprising:
 (a) a hopper;
 (b) a singulating plate slidably mounted within said hopper and generally forming the bottom thereof, said singulating plate having a plurality of receiving openings formed therein;

(c) a buffer structure stationarily mounted within said hopper above said singulating plate;

(d) a transfer plate slidably mounted immediately below said singulating plate, said transfer plate including a plurality of receiving openings spaced apart so as to correspond with the spacing of said receiving openings of said singulating plate such that the receiving openings of said transfer and singulating plates may be aligned;

(e) a stationary dispensing plate disposed below said transfer plate and having receiving openings formed therein that correspond to the spacing of the receiving openings of said transfer plate;

(f) biasing means for biasing said singulating and transfer plates to an initial position where the receiving openings of each are in alignment and offset relative to the receiving openings formed within said stationary dispensing plate;

(g) means for reciprocally sliding said singulating plate back and forth after each transfer from said singulating plate to said dispensing plate; and (h) control means for selectively shifting said transfer plate from a position where the receiving openings therein are aligned with the receiving openings of said singulating plate to a position where the receiving openings of said transfer plate are in alignment with the receiving openings of said dispensing plate such that a transfer may be made from the receiving openings of said singulating plate to the receiving openings of said dispensing plate, said control means for shifting said transfer plate and said means for reciprocally sliding said singulating plate including a common linkage means operatively connected to and actuated by an electric motor, said common linkage means including means for sliding said transfer plate from its initial position to a second position where the receiving openings thereof align with the receiving openings of said dispensing plate and returning said transfer plate back to said initial position, and wherein said common linkage means is adapted to move said singulating plate from said initial position to a second position in response to said transfer plate being moved back from said second position to said initial position.

2. The singulating and dispensing apparatus of claim 1 wherein said buffer structure includes a plurality of spaced apart vertically oriented plates, said plates being stationarily disposed within said hopper and aligned to extend perpendicular to the direction of travel of said singulating plate.

3. The singulating and dispensing apparatus of claim 2 including a support frame structure supporting said hopper and associated plates, and including a plurality of drop tubes depending from the lower side of said stationary dispensing plate, each drop tube being communicatively connected to a respective receiving opening.

* * * * *